July 7, 1925.
1,545,195
P. NOGUES
CINEMATOGRAPHIC APPARATUS, MORE PARTICULARLY APPLICABLE
TO APPARATUS FOR TAKING VIEWS AT HIGH SPEED
Filed April 9, 1924
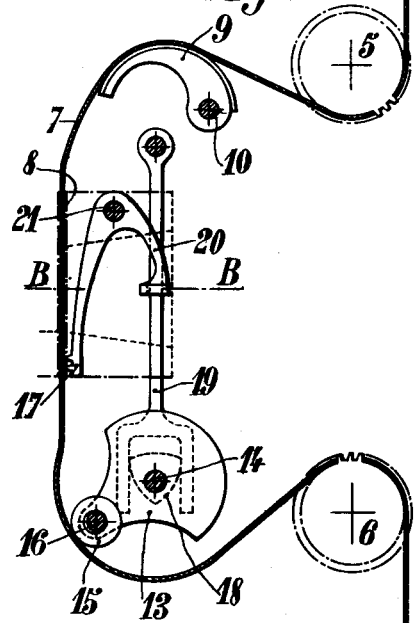
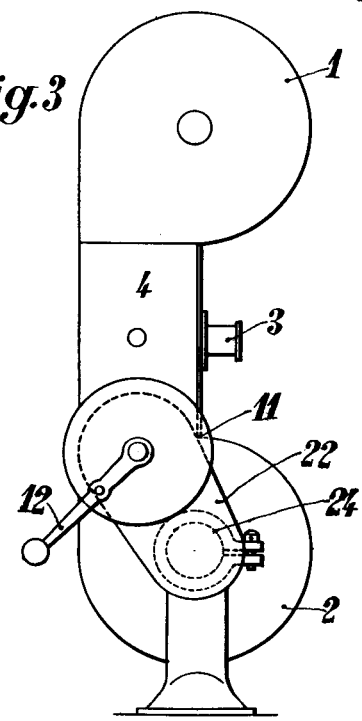
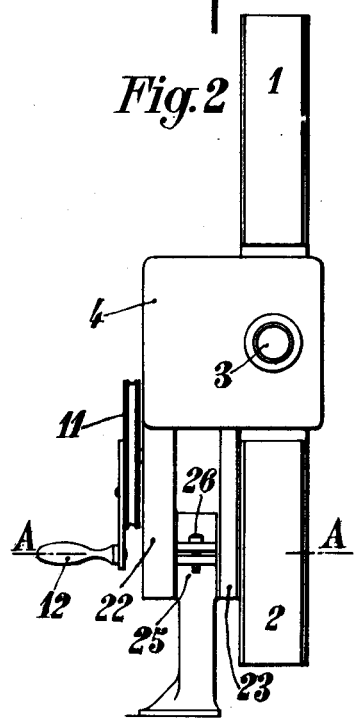

Patented July 7, 1925.

1,545,195

UNITED STATES PATENT OFFICE.

PIERRE NOGUÈS, OF BOULOGNE-SUR-SEINE, FRANCE.

CINEMATOGRAPHIC APPARATUS, MORE PARTICULARLY APPLICABLE TO APPARATUS FOR TAKING VIEWS AT HIGH SPEED.

Application filed April 9, 1924. Serial No. 705,358.

*To all whom it may concern:*

Be it known that I, PIERRE NOGUÈS, a citizen of the French Republic, residing at Institut Marey, Parc des Princes, Boulogne-sur-Seine, Seine, France, have invented new and useful Improvements in cinematographic apparatus, more particularly applicable to apparatus for taking views at high speed, of which the following is the specification.

The present invention relates to cinematographic apparatus and more particularly to apparatus for taking views at high speed. These improvements concern the mechanism which ensures the intermittent displacement of the film in the focal plane of the objective and to various details of construction concerning the fitting up of the whole of the apparatus on its supporting tripod, and this supporting tripod itself.

The improved intermittent driving mechanism for the film in accordance with the subject-matter of the invention is characterized by the combination with two toothed driving cylinders for the film which rotate with a continuous movement, of a Demeny cam the theoretical axis of the roller of which is capable of free displacements relatively to the trunnion which carries it and which describes a circular trajectory, so that the loop of the film previously provided from a toothed cylinder to the other, is periodically subjected to a tension which causes in the focal plane of the objective a displacement rigorously equal to the height of an image and without possible tearing of the perforated margins of the film, owing to the combined actions of the roller, of a surface of suitable curvature settable at will on which slides and abuts the looped portion of the film before its passage in the guide frame and of a rocking comb the teeth of which enter at the required moment on the marginal holes of the film, so as to immobilize it in the chosen position at the time of the impression.

The accompanying drawing diagrammatically illustrates and by way of example only, a form of construction of an improved cinematographic apparatus for taking views, in accordance with the subject-matter of the invention and called "Ultracinéma".

Fig. 1 is a diagram of the mechanism for intermittently driving the film.

Fig. 2 is a front external view of the whole of the apparatus.

Fig. 3 is a corresponding side view.

The apparatus illustrated is more particularly adapted for taking views, but it is quite as well suited for the projection of images and more generally speaking to any machine adapted to move a film or perforated roll with an intermittent movement, without necessitating the modification of the fundamental driving mechanism of this film. The roll of non impressed film is placed in the upper magazine 1 and the impressed film is received in the lower magazine 2 (Fig. 2 and 3). On either side of the focal axis B—B of the objective 3, and in the dark camera 4 of the apparatus are mounted two toothed cylinders 5 and 6 for driving the film 7 which is formed in a loop for passing in the guide frame 8, so as to present in the focal plane of the objective a plane portion having at least the dimensions of an image. At its upper portion the loop of film 7 goes round a suitable curved surface 9 settable at will about an axis 10 which is out of center relatively to the center of figure: this arrangement permitting to adjust with precision, in an another manner than by a suitable locking of the toothed cylinders, the length of the feed loop of the film. Any suitable locking device permits of immobilizing this surface in the chosen position. The two toothed cylinders 5 and 6 rotate with the same continuous and uniform movement, owing to any suitable cinematic gearing, not shown in the drawing, which is driven through the pulley 11, by a motor or by hand by means of the crank 12.

The cam used for ensuring the intermittent tension of the looped portion of the film is, as already indicated, an improved Demeny cam. It is constituted by a crank pin 13 the continuous rotation of which is ensured through its axis 14 the movement of which is synchronized with that of the toothed cylinders. The roller 15 which comes periodically in contact with the film is made of light material or of material worked in such a manner that its weight does not exceed a certain value, depending solely on the limit speed of rotation, and suitably chosen, so that the centrifugal tension may be inferior to the limit of resistance of the film and of its perforations. This roller 15 is mounted on the trunnion 16 of the crank pin 13 with a certain play. During the rotation of the crank pin 13, the centrifugal force to which the roller 15 is subjected, puts the latter out of center with the theoretical axis of the trunnion 16. The eccentric roller, during its rotation, strikes the film and drives it during a certain angular displacement about the axis 14.

When the number of images in the unit of time exceeds a certain value, the film, under the influence of the linear speed imparted to it by the roller 15, tends to move, by inertia, beyond the position it must normally occupy at the time of the impression in the guide frame.

In fact, the speed of the film, uniform at the level of the plane tangent to the cylinder 5, is varied in the plane tangent to the roller 15, since it passes through a maximum for coming back to zero according to a curve having a smaller and smaller slope, as can be seen by the cinematic study of the device. Now, experiments show that once started, the film loses contact with the roller, it possesses an excess of vis viva. The abutted surface 9 then intervenes for destroying this excess of vis viva and reestablishing this contact a little before the definitive stoppage and while the pulling speed by the roller is relatively small.

At the precise moment, a rocking comb 17 enters in the marginal perforations of the film and the roller 15 continuing its rotation, brings the upper edge of these perforations in perfect contact with the upper flank of the teeth of the comb.

The toothed cylinder 6 is adjusted in such a manner that the roller acts for ensuring this contact not by rigid bearing under the thrust of the axis 16, but only by its centrifugal tension.

The stoppage once obtained, the photographic impression takes place. The weight of the roller being suited to the mechanical resistance of the film, no breaking and tearing can occur. This weight is determined, from this mechanical resistance, by the current methods of calculation.

Any cinematic system capable of synchronizing the oscillations of the comb 17 with the movement of the axis 14 can be used.

In the example illustrated in Fig. 1, a Trezel eccentric 18 rigidly secured on the axis according to one of its three centres of curvature, acts on the rocking fork 19 which transmits its oscillations to the arm 20 angularly rigid with the comb 17 pivoted at 21.

It will be seen that the film, projected by the roller 15, first retained by the surface 9 and then by the comb 17, is compelled to take in the focal plane of the objective a position always rigorously exact, up to a very high frequency which seems to have for limit 600 to 700 images per second.

The apparatus thus constructed comprises two other improvements of details respectively shown in Figs. 2 and 3 and 4 and 5.

The dark camera 4 which encloses the mechanism diagrammatically shown in Fig. 1 receives the two magazines 1 and 2 situated in the vertical axial plane of the objective 3 and the casing 22 enclosing the driving and reduction mechanism, is connected to the arm 23 of the frame by a hollow axis 24 which forms a trunnion adjusted in an extensible bearing 24 secured on the small board of the jointed tripod supporting the whole. Owing to the screw 26 or any suitable clamping, it is possible to set the apparatus on its tripod held fixed, by causing it to pivot according to the desired angle about the axis A—A and to subsequently lock it in the angular position chosen.

What I do claim as my invention and desire to secure by Letters Patent is:—

1. In a cinematographic apparatus for taking or projecting views at a high speed, the combination, with two toothed cylinders for driving the film, rotating in the same direction and at constant speed, of a Demeny cam the theoretical axis of the roller of which is capable of free displacements relatively to the trunnion which carries it and which describes a circular trajectory, of a cylindrical surface settable at will about an axis parallel to its generatrices for serving as abutment for the loop of film provided between the two toothed cylinders driving the film, and means for immobilizing the film when taking or projecting an image.

2. In a cinematographic apparatus, an intermittent film operating mechanism formed of a "Demeny" cam, having its roller mounted, with between $\frac{2}{10}$ and $\frac{5}{10}$ millimeter play, on a trunnion which sets it in continuous rotation to periodically tense a film loop between two connected cylinders rotating at the same uniform movement, said mechanism being combined, on the one hand, with a shoe adapted to be turned about a fixed axis and having a cylindrical surface adapted to break the film loop before its passage into an image exposing and printing frame and, on the other, with means to hold immovable the portion of the loop exposed in the frame during the exposition.

3. In a cinematographic apparatus, an intermittent film operating mechanism comprising in combination a tension member for a loop of said film provided between two connected cylinders rotating with the same uniform movement, said tension member being a Demeny cam whose roller is mounted on its trunnion with a play of $\frac{2}{10}$ to $\frac{5}{10}$ of a millimeter, a shoe rotatable about a fixed axis and having a cylindrical brake surface for the film loop before its entrance into an image exposing and printing frame, an oscillating comb actuated by a Trezel eccentric keyed on the axis of rotation of the Demeny cam and admitting per frame the arms of an oscillating fork connected with said comb, whose teeth engage in the perforations of the film to render immovable that portion thereof in the exposing frame.

In testimony whereof I have signed my name to this specification.

PIERRE NOGUÈS.